(12) United States Patent
Czelnik et al.

(10) Patent No.: US 9,069,428 B2
(45) Date of Patent: Jun. 30, 2015

(54) METHOD FOR THE OPERATOR CONTROL OF A MATRIX TOUCHSCREEN

(75) Inventors: Mark Peter Czelnik, Wolfsburg (DE); Lennart Bendewald, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 224 days.

(21) Appl. No.: 13/982,325

(22) PCT Filed: Nov. 28, 2011

(86) PCT No.: PCT/EP2011/005961
§ 371 (c)(1),
(2), (4) Date: Jul. 29, 2013

(87) PCT Pub. No.: WO2012/100795
PCT Pub. Date: Aug. 2, 2012

(65) Prior Publication Data
US 2013/0307825 A1    Nov. 21, 2013

(30) Foreign Application Priority Data

Jan. 29, 2011 (DE) .......................... 10 2011 009 710

(51) Int. Cl.
*G06F 3/041* (2006.01)
*G06F 3/044* (2006.01)
*B60K 35/00* (2006.01)
(Continued)

(52) U.S. Cl.
CPC ................ *G06F 3/044* (2013.01); *B60K 35/00* (2013.01); *G06F 3/0416* (2013.01); *G06F 3/0488* (2013.01); *B60K 37/06* (2013.01); *B60K 2350/1004* (2013.01); *B60K 2350/1028* (2013.01); *B60K 2350/352* (2013.01)

(58) Field of Classification Search
CPC ............................................ G06F 3/041–3/047
See application file for complete search history.

(56) References Cited

U.S. PATENT DOCUMENTS

| 6,606,420 B1 | 8/2003 | Loce et al. |
| 7,348,991 B1 * | 3/2008 | Keating et al. ................. 345/589 |
| 2006/0161871 A1 | 7/2006 | Hotelling et al. |

(Continued)

FOREIGN PATENT DOCUMENTS

| DE | 20102197 U1 | 6/2001 |
| DE | 60220933 T2 | 4/2008 |

(Continued)

OTHER PUBLICATIONS

International Preliminary Report on Patentability for International Patent Application No. PCT/EP2011/005961; Jul. 30, 2013.

(Continued)

*Primary Examiner* — Gerald Johnson
*Assistant Examiner* — Christopher Kohlman
(74) *Attorney, Agent, or Firm* — Barnes & Thornburg LLP (57) ABSTRACT

A method for the operation of a capacitive, matrix touchscreen for use in a motor vehicle, wherein touching the matrix touchscreen in the region of a matrix element produces a signal level associated with the matrix element, wherein the extent of a signal level which is produced by touching the matrix touchscreen in the region of the matrix element and which is associated with the matrix element is altered, and wherein the thus modified signal levels of two adjacent matrix elements are taken as a basis for determining whether the two matrix elements are being touched as part of collective areal touching of the matrix touchscreen.

8 Claims, 11 Drawing Sheets

(51) Int. Cl.
*G06F 3/0488* (2013.01)
*B60K 37/06* (2006.01)

(56) References Cited

U.S. PATENT DOCUMENTS

| | | |
|---|---|---|
| 2008/0158145 A1 | 7/2008 | Westerman |
| 2008/0309629 A1 | 12/2008 | Westerman et al. |
| 2009/0095540 A1 | 4/2009 | Zachut et al. |
| 2009/0284491 A1 | 11/2009 | Chen et al. |
| 2009/0284495 A1 | 11/2009 | Geaghan et al. |
| 2011/0216016 A1* | 9/2011 | Rosener .................. 345/173 |

FOREIGN PATENT DOCUMENTS

| | | | |
|---|---|---|---|
| EP | 1517228 | A2 | 3/2005 |
| WO | 2009007704 | A1 | 1/2009 |
| WO | 2009154596 | A1 | 12/2009 |

OTHER PUBLICATIONS

Chang et al.; A linear-time component-labeling algorithm using contour tracing technique; Computer Vision and Image Understanding; 2003; 15 pages.

U.S. Appl. No. 11/928,629, filed Oct. 30 2007.

Search Report for German Patent Application No. 10 2011 009 710.4; Jun. 29, 2011.

Search Report for International Patent Application No. PCT/EP2011/005961; Apr. 19, 2012.

* cited by examiner

|  Touch | Sampling time i ||
| --- | --- | --- |
|  | 51 | 52 |
| 41 | D11 | D21 |
| 42 | D12 | D22 |
| 43 | D13 | D23 |

FIG. 20

|  Touch | Sampling time i ||
| --- | --- | --- |
|  | 51 | 52 |
| 41 | 2 | 10 |
| 42 | 4 | 7 |
| 43 | 8 | 2 |

FIG. 21

|  Touch | Sampling time i ||
| --- | --- | --- |
|  | 51 | 52 |
| 41 | 2 | 10 |
| 42 | - | 7 |
| 43 | 8 | 2 |

FIG. 22

|  Touch | Sampling time i ||
| --- | --- | --- |
|  | 51 | 52 |
| 41 | 2 | 10 |
| 42 | - | - |
| 43 | 8 | 2 |

METHOD FOR THE OPERATOR CONTROL OF A MATRIX TOUCHSCREEN

PRIORITY CLAIM

This patent application is a U.S. National Phase of International Patent Application No. PCT/EP2011/005961, filed 28 Nov. 2011, which claims priority to German Patent Application No. 10 2011 009 710.4, filed 29 Jan. 2011, the disclosures of which are incorporated herein by reference in their entirety.

FIELD

Disclosed embodiments relate to a method for the operator control of a capacitive, matrix touch screen, in particular a touch screen arranged in a motor vehicle, wherein touching the matrix touch screen in the region of a matrix element prompts a signal level associated with the matrix element to be produced.

BACKGROUND

A touch screen is known from DE 201 02 197 U1, for example. DE 201 02 197 U1 discloses a touch screen for the visual display of electronic signals and confirmational touch input of characters and symbols comprising a function level for the visual display and key input and a corresponding, higher-level, selectively deformable protection level. DE 602 20 933 T2 discloses a method for distinguishing between two or more temporally overlapping pieces of touch information in a touch screen system. US 2006/0161871 A1 discloses an input/output platform which has an input/output interface having one or more input/output devices. Furthermore, a proximity system for detecting whether there is a finger in the close surroundings of the input/output interface without touching it is provided.

EP 1 517 228 A2 discloses a method for gesture recognition, wherein an image is presented on a touch surface, wherein a touch of this contact face is detected and it is ascertained whether multiple touches correspond to a gesture, the image presented being altered when a particular gesture is recognized.

U.S. patent application Ser. No. 11/928,629 dated Oct. 30, 2007 describes a motor vehicle having a touch screen arranged in a passenger compartment of the motor vehicle for the output of an output signal which is dependent on a touch of the touch screen and having a control arrangement for evaluating the output signal for the purpose of handwriting recognition for the recognition of a text in a language based on an alphabet, a language based on syllabary and/or a language based on graphic characters.

WO 2009/007704 A1 discloses a touch panel having a plurality of sensor elements which are distributed over the face of the touch panel, wherein a capacitance measuring circuit is connected to the sensor elements in order to obtain capacitance signals. On the basis of these capacitance signals, the coordinates of touches of the touch panel are ascertained.

US 2009/0284491 A1 discloses a matrix-based touch screen for detecting multiple touches.

US 2008/0309629 A1 discloses a method for processing areas which are identified when a touch screen is touched on the basis of a plurality of pixels which have touch values from a touch sensor panel, wherein pixels which have no touch values which indicate no touch are removed. By contrast, pixels which are not removed are processed using a watershed algorithm.

US 2008/0158145 A1 discloses a method for processing values from a touch screen (touch sensor device). This involves the production of an image which is segmented for the purpose of identifying a plurality of touch areas.

US 2009/0095540 A1 discloses a method for classifying an input for a multitouch sensitive digitizer. This involves the identification of a plurality of discrete regions and the determination of a relationship between at least two regions.

SUMMARY

Disclosed embodiments specify an improved operator control device and to improve the operator control, particularly of a motor vehicle. In this case, it should be borne in mind that a motor vehicle requires reliable operator control to be effected without a user needing to look at an operator control device for a relatively long time. Reliable and robust operator control needs to be ensured when a user throws a glance at an operator control device for a short time.

BRIEF DESCRIPTION OF THE DRAWINGS

Further embodiments emerge from the description below, in which.

DETAILED DESCRIPTION OF THE DISCLOSED EMBODIMENTS

Disclosed embodiments provide a method for operating a capacitive, matrix touch screen, in particular for use in a motor vehicle, wherein touching the matrix touch screen in the region of a matrix element prompts a signal level associated with the matrix element to be produced, wherein the signal level associated with the matrix element which is produced when the matrix touch screen is touched in the region of the matrix element is modified such that the signal level is increased when this signal level exceeds an upper signal level limit value, in particular at a maximum signal level, is decreased when this signal level is below a lower signal level limit value, particularly at a minimum signal level, and/or is scaled when this signal level is below the upper signal level limit value but exceeds a lower signal level limit value, and wherein the modified signal levels of two adjacent matrix elements are advantageously taken as a basis for determining whether the two matrix elements have been touched as part of a joint two-dimensional touch of the matrix touch screen.

A matrix element may be a pixel. A matrix touch screen may be a matrix touch screen segmented into columns and rows. A matrix touch screen may be a matrix touch screen in which the matrix elements or pixels are associated with one row each and one column each. A matrix touch screen may be a multitouch screen for detecting the position of at least two simultaneously occurring touches of the multitouch screen. At least one disclosed embodiment of a matrix touch screen is the touch input system disclosed in US 2009/0284495 A1, for example, or the touch sensor 110. Another disclosed embodiment of a matrix touch screen is the touch sensor panel 124 disclosed in US 2008/0309629 A1, for example. A matrix touch screen may be arranged in a motor vehicle. A matrix touch screen may be used for the operator control of the function of a motor vehicle. A function of a motor vehicle may be the reception frequency of a radio, the volume of an audible output in the motor vehicle, a tone setting (nature and balance), a selection of a map detail, a title selection, a selection of a destination and/or a temperature setting. A function of a motor vehicle may be a function for which a setpoint value from a selection of, in particular continuous, values is intended to be met. A function of a motor vehicle may be a function that can be set on an analog basis, in particular following a scale. In at least one disclosed embodiment, the function of the motor vehicle comprises scrolling through a list. In another disclosed embodiment, the function of the motor vehicle comprises the displacement of a map detail. In yet another disclosed embodiment, the function of the motor vehicle comprises the scaling of a map detail. In a further disclosed embodiment, the function of the motor vehicle comprises the movement of an element presented on the display.

A signal level associated with a matrix element is not a binary value but rather an analog value or a digitized value which can assume more than two values. A signal level may be a digitized value for an analog output variable of a matrix touch screen.

When the signal level is scaled, provision is particularly made for the region between the upper signal level limit value and the lower signal level limit value to be projected onto a region between zero and the maximum possible value of the signal level (maximum signal level). Such a projection is shown by way of example in FIG. 8.

An upper signal level limit value is not smaller than a lower signal level limit value. An upper signal level limit value may be the same as a lower signal limit value.

A suitable algorithm for determining whether the matrix elements are touched as part of a joint two-dimensional touch of the matrix touch screen is disclosed by the article "A Linear-Time Component-Labeling Algorithm Using Contour Tracing Technique", Fu Chang, Chun-Jen Chen and Chi-Jen Lu, Institute of Information Science, Academia Sinica, 128 Academia Road, Section 2, Nankang, Taipei 115 Taiwan, www.iis.sinica.edu.tw/~fchang/paper/component_labeling_cviu.pdf. The method described in this article presupposes binary values. In order to be able to apply this algorithm for the aforementioned signal levels, the latter are assigned to a first variable when they are above a particular limit value and are assigned to a second variable when they are not above this limit value. The signal levels reduced to binary signals in this manner are then processed by means of the aforementioned algorithm, advantageously only a neighborhood of four being assumed.

Provision may be made for the determination or detection of whether (two) matrix elements are touched as part of a joint two-dimensional touch of the matrix touch screen to be preceded by interpolation in order to produce from a matrix element a plurality of (particularly four) pseudo matrix elements which are each again assigned an (interpolated) signal level. Provision may be made for the signal level associated with a pseudo matrix element to be subsequently modified such that the signal level is increased when this signal level exceeds an upper signal level limit value, particularly at a maximum signal level, is decreased when this signal level is below a lower signal level limit value, particularly at a minimum signal level, and/or is scaled when this signal level is below the upper signal level limit value but exceeds a lower signal level limit value.

Where reference is made to a matrix element below, this may also be a reference to a pseudo matrix element. Where reference is made to a signal level of a matrix element below, this may also be a reference to a signal level (calculated by interpolation) of a pseudo matrix element.

In another disclosed embodiment, the modified signal levels of a matrix element and of (at least, but in particular precisely) four matrix elements adjacent to this matrix element are taken as a basis for determining whether the matrix element and the adjacent matrix elements are touched as part of a joint two-dimensional touch of the matrix touch screen.

In a further disclosed embodiment, the upper signal level limit value for a matrix element is determined on the basis of the sum of the signal levels of a plurality of matrix elements in the row of the matrix element or the sum of the signal levels of (essentially) all or all essential matrix elements in the row of the matrix element. In yet another disclosed, the upper signal level limit value for a matrix element is determined on the basis of the sum of the signal levels of a plurality of matrix elements in the column of the matrix element or the sum of the signal levels of (essentially) all or all essential matrix elements in the column of the matrix element. A plurality of matrix elements in a row or in a column may be a fixed or predetermined number of matrix elements or pixels. A plurality of matrix elements in a row or in a column may be a number of matrix elements or pixels which is stipulated independently of the touch of the matrix touch screen. A row may be a horizontal arrangement of matrix elements or pixels. A column may be a vertical arrangement of matrix elements or pixels.

In still another disclosed embodiment, the sum of the signal levels is set (essentially) to zero when it is below a limit value. In a further disclosed embodiment, the sum of the signal levels is scaled when it exceeds a or the limit value, and yet another disclosed embodiment, the sum of the signal levels is multiplied by a scaling factor when it exceeds a or the limit value.

In another disclosed embodiment, the distance of a detected two-dimensional touch of the matrix touch screen at a sampling time from a detected two-dimensional touch of the matrix touch screen at a preceding sampling time is ascertained, with provision advantageously being made for the ascertained distance to be taken as a basis for determining whether the detected two-dimensional touches are part of the same touching movement over the matrix touch screen. In a further disclosed embodiment, the distances of the detected two-dimensional touches of the matrix touch screen at a sampling time from the detected two-dimensional touches of the matrix touch screen at a preceding sampling time are ascertained, with provision advantageously being made for the ascertained distances to be taken as a basis for determining whether the detected two-dimensional touches are part of the same touching movement over the matrix touch screen.

A distance needs to be ascertained particularly from the centroid of the face and/or from another point which defines or describes the center of the touch. A preceding sampling time may be the directly preceding sampling time. If the touch of a matrix touch screen is ascertained at the sampling time i, the preceding sampling time may be the sampling time i−1. The term sampling time relates to the digitization or the digital capture of touches of the matrix touch screen.

A touching movement over the matrix touch screen is intended to be translated into a trajectory. Such a trajectory can be used for displacing a graphical element on a display or for identifying a letter, a graphic character or a number, for example.

In a yet another disclosed embodiment, touches or the touches are not categorized as part of the same touching movement over the matrix touch screen when the distance between these touches exceeds a limit value.

In still another disclosed embodiment, the limit value is dependent on the function which is intended to be controlled by means of the touching movement. For the purposes of the disclosed embodiments, a function may be a function of the motor vehicle. A function may be displayed on a display.

In another disclosed embodiment, the limit value is determined on the basis of the formula $$D_{max}=i \cdot k \cdot \Delta t \cdot v_{max},$$

where $D_{max}$ is the limit value, i is an interpolation factor, k is the distance between two parallel sensor lines of the matrix touch screen or the real resolution of the matrix touch screen, $\Delta t$ is the sampling interval and $v_{max}$ is a speed limit value. A sampling interval is the interval of time between two sampling times. An interpolation factor indicates how many intermediate steps between two sensor lines of the matrix touch screen are used for position finding by interpolation. By way of example, if provision is made for the center between two sensor lines to be used as a single interpolation value in order to associate a distinct position with a touch, the interpolation factor is 2. If no interpolation is performed, the interpolation factor is equal to 1, i.e. the limit value is advantageously determined or calculated on the basis of the formula $$D_{max}=k \cdot \Delta t \cdot v_{max}.$$

In a further disclosed embodiment, the speed limit value is not greater than 0.25 m/s when the function is the displacement of a graphical element on a display. By way of example, a graphical element for the may be an icon, a virtual operator control element and/or a map or a map detail. In yet another disclosed embodiment, the speed limit value is 0.25 m/s when the function is the displacement of a graphical element on a display. In still another disclosed embodiment, the speed limit value is not greater than 0.5 m/s when the function is handwriting input. In a further disclosed embodiment, the speed limit value is 0.5 m/s when the function is handwriting input. In another disclosed embodiment, the speed limit value is not greater than 1 m/s when the function is the scrolling of list entries displayed on a display. In still another disclosed embodiment, the speed limit value is 1 m/s when the function is the scrolling of list entries displayed on a display. In a further disclosed embodiment, the speed limit value is lower when the function is the displacement of a graphical element on a display than when the function is handwriting input. In yet another disclosed embodiment, the speed limit value is lower when the function is the displacement of a graphical element on a display than when the function is the scrolling of list entries displayed on a display. In still another disclosed embodiment, the speed limit value is lower when the function is handwriting input than when the function is the scrolling of list entries displayed on a display. In another disclosed embodiment, the speed limit value is greater than 1 m/s when the function is a swiping movement.

In a further disclosed embodiment, a touch of the matrix touch screen at a sampling time has that touch of the matrix touch screen at a preceding sampling time that is at the shortest distance from the touch of the matrix touch screen at the sampling time associated with it. In yet another disclosed embodiment, every touch of the matrix touch screen at a sampling time has that touch of the matrix touch screen at a preceding sampling time that is at the shortest distance from the touch of the matrix touch screen at the sampling time associated with it. In still another disclosed embodiment, when a touch of the matrix touch screen at the sampling time has more than one touch of the matrix touch screen at a preceding sampling time associated with it, all associations between these touches except for the association at the shortest distance are erased.

Disclosed embodiments are suitable for use in motor vehicles or for touch screens which are provided in motor vehicles for the operator control of the motor vehicle or for the operator control of functions of the motor vehicle. The vibration and the shortest possible visual contact with the touch screen, as is typical for situations in motor vehicles, mean that there are, in particular, imprecise and/or two-dimensional and/or multiple touches which result in not insubstantial fuzziness of the input. Disclosed embodiments allow better identification of the desired touch to be ensured. Disclosed embodiments can be used to detect touches by the ball of a thumb and touches for the operator control of a virtual rotary control on a display in a particularly suitable manner. In this way, it is possible, by way of example, to set a reception frequency for a radio, to set a volume for an audible output in a motor vehicle, to select a destination or a temperature setting using a virtual rotary control. In particular, functions of a motor vehicle which are intended to be controlled by means of a virtual rotary control can be controlled in a particularly suitable manner.

A motor vehicle may be a land vehicle which can be used individually in road traffic. Motor vehicles are not limited to land vehicles with an internal combustion engine.

Figure 1:
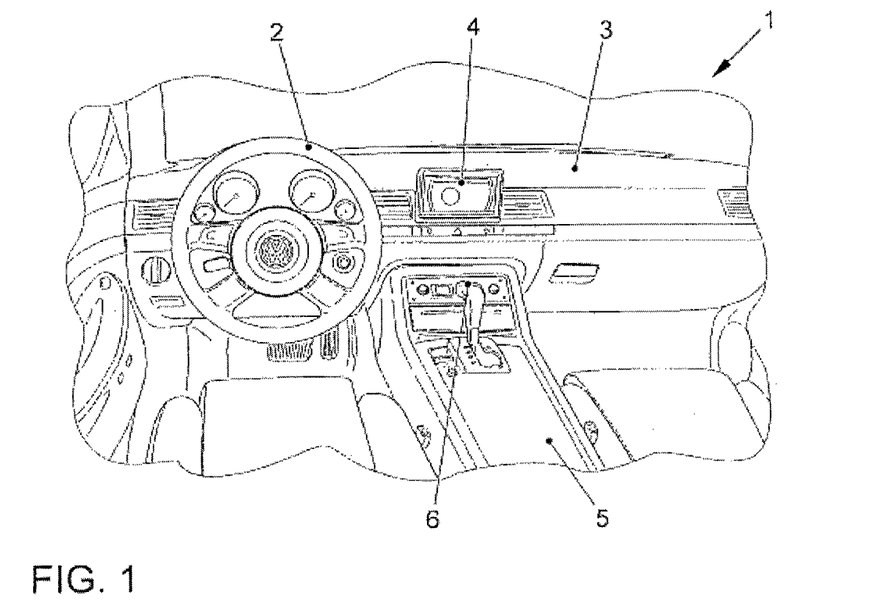
FIG. 1 shows a disclosed embodiment of a detail from an interior view of a motor vehicle.
Figure 2:
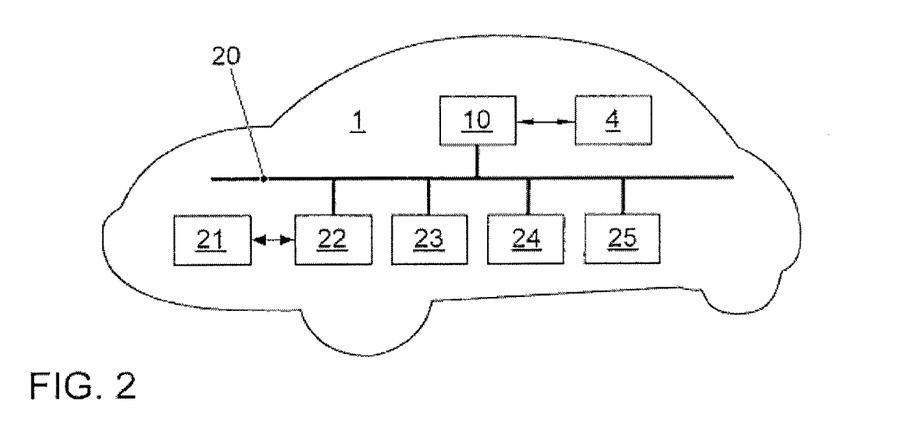
FIG. 2 shows a block diagram of the motor vehicle shown in FIG. 1.

FIG. 1 shows a disclosed embodiment of a detail from an interior view of a motor vehicle 1 which is shown in a block diagram in FIG. 2. In this case, the motor vehicle 1 comprises an operator control apparatus 4 which is arranged on the dashboard 3 next to the steering wheel 2. The operator control apparatus 4 can be used to control a navigation system 23 and also, by way of example, an automatic air conditioning system 24, an infotainment system 25 and—via a mobile telephone interface 22—a mobile telephone 21. In addition, the operator control apparatus 4 is coupled to a display controller 10 which is connected to the telephone interface 22, to the navigation system 23, to the automatic air conditioning system 24 and to the infotainment system 25 by means of a bus system.

Figure 3:
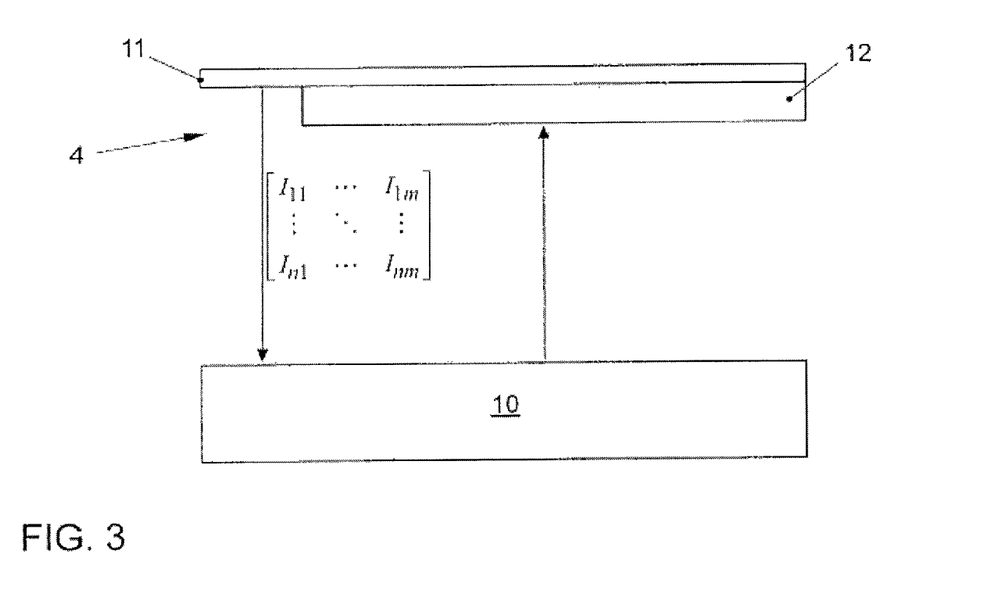
FIG. 3 shows a disclosed embodiment of an operator control apparatus.

The operator control apparatus 4 comprises—as FIG. 3 shows—a display 12 for presenting variable information and a transparent matrix touch screen 11 which is arranged above the display 12. Provision may (alternatively or additionally) also be made for the matrix touch screen 11 to be arranged so as to be physically separate from the display 12. By way of example, the matrix touch screen 11 may thus be arranged in the region of the central console 5 of the motor vehicle 1. Alternatively or additionally, the matrix touch screen 11 may also be arranged in the region of a gear lever knob 6 in the motor vehicle 1.

The matrix touch screen 11 comprises a matrix-like structure of conductive lines/faces with columns and rows. By way of example, this structure may consist of or comprise ITO faces or fine wires.

Figure 4:
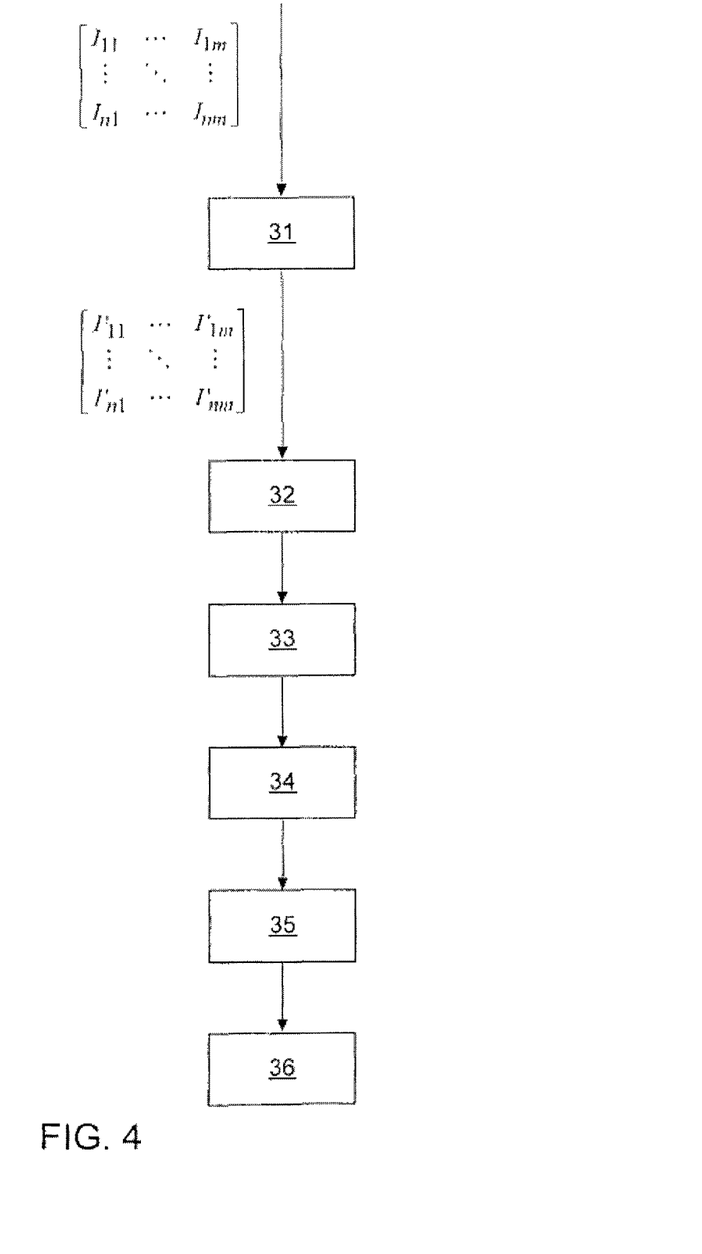
FIG. 4 shows a disclosed embodiment of a contrast correction module.
Figure 5:
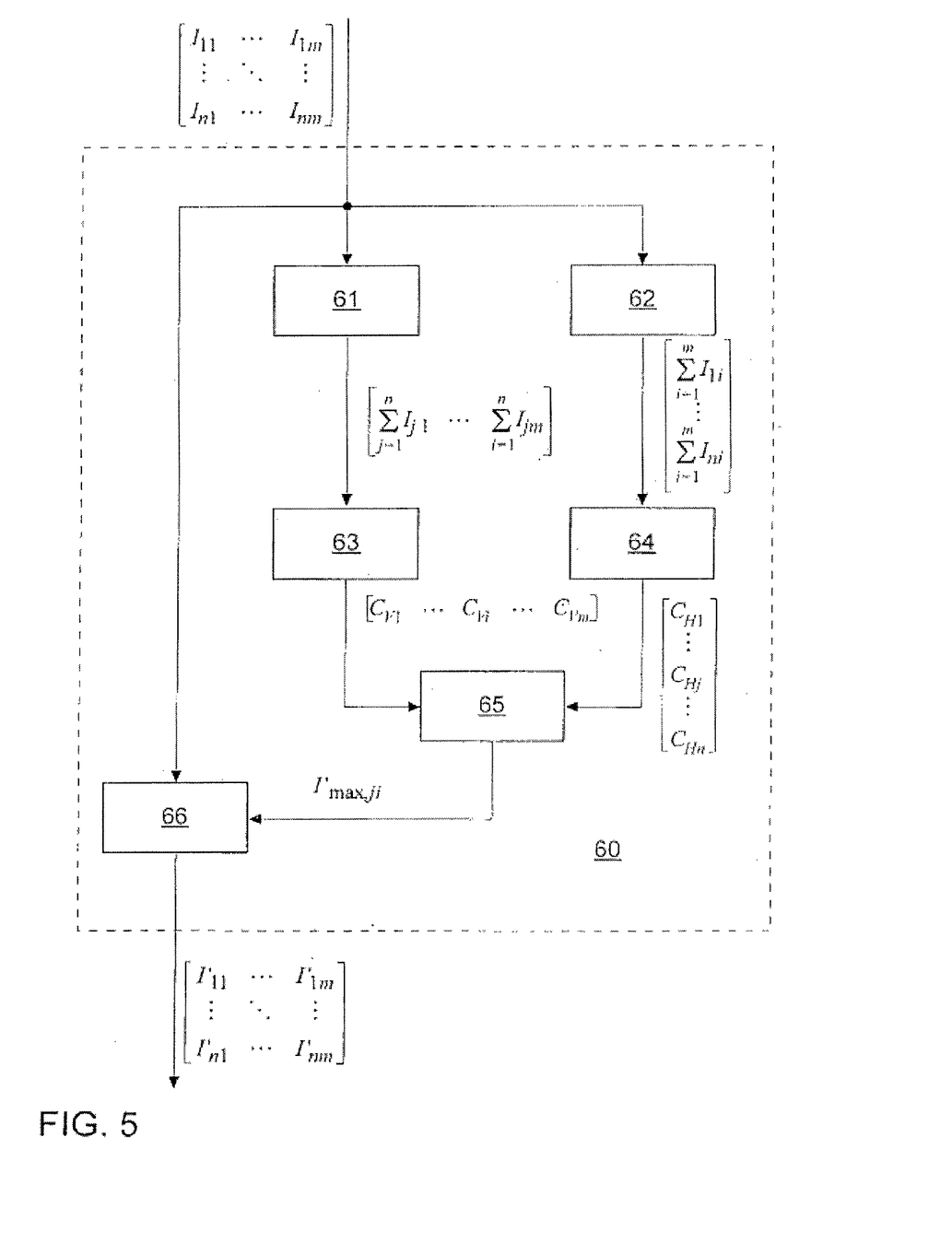
FIG. 5 shows the contrast correction module shown in FIG. 4.

FIG. 4 shows a method implemented in the display controller 10 for processing the output value $$\begin{bmatrix} I_{11} & \cdots & I_{1m} \\ \vdots & \ddots & \vdots \\ I_{n1} & \cdots & I_{nm} \end{bmatrix}$$

from the matrix touch screen 11. The method begins with a step 31 for contrast adjustment. To this end, the display controller 10 comprises—as shown in FIG. 5—a contrast correction module 60. In this case, the values $I_{ji}$ denote the signal levels of the relevant matrix elements or pixels in the j-th row and in the i-th column. The contrast correction module 60 comprises a vertical projection module 61 and a horizontal projection module 62 for ascertaining what is known as a vertical projection, that is to say $$\begin{bmatrix} \sum_{j=1}^{n} I_{j1} & \cdots & \sum_{i=1}^{n} I_{jm} \end{bmatrix}$$

or a horizontal projection, that is to say $$\begin{bmatrix} \sum_{i=1}^{m} I_{1i} \\ \vdots \\ \sum_{i=1}^{m} I_{ni} \end{bmatrix}.$$

Figure 6:
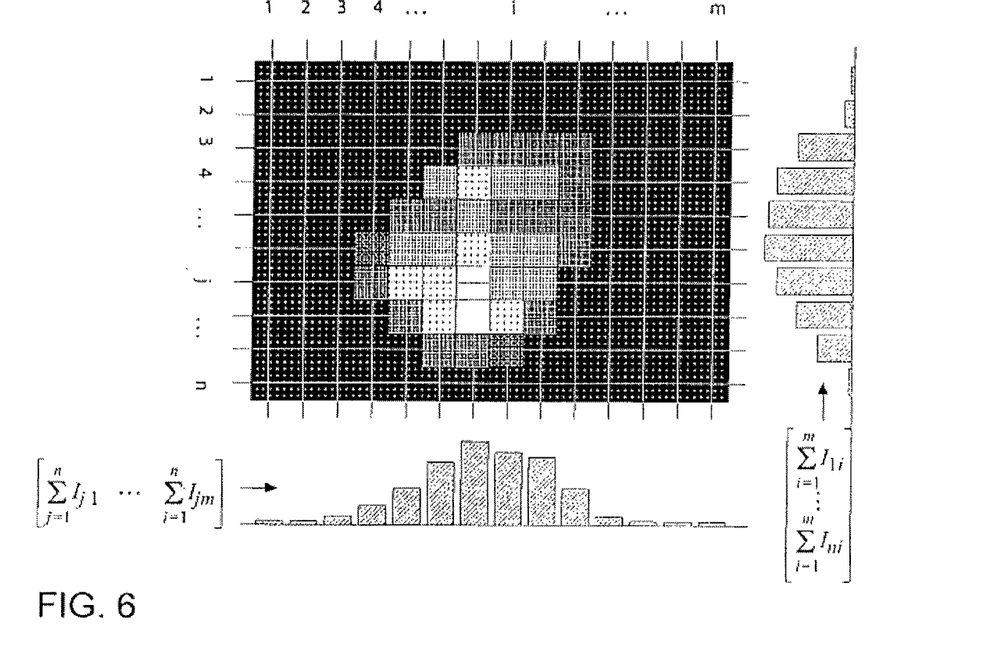
FIG. 6 shows an explanation of the functioning or operation of a vertical projection module and of a horizontal projection module.

The operation of the vertical projection module 61 and of the horizontal module 62 is shown by way of example in FIG. 6, where the signal levels $I_{ji}$ are symbolized by grayscale such that light shades symbolize a high signal level $I_{ji}$ and black shades or dark gray shades symbolize a low signal level $I_{ji}$.

Figure 7:
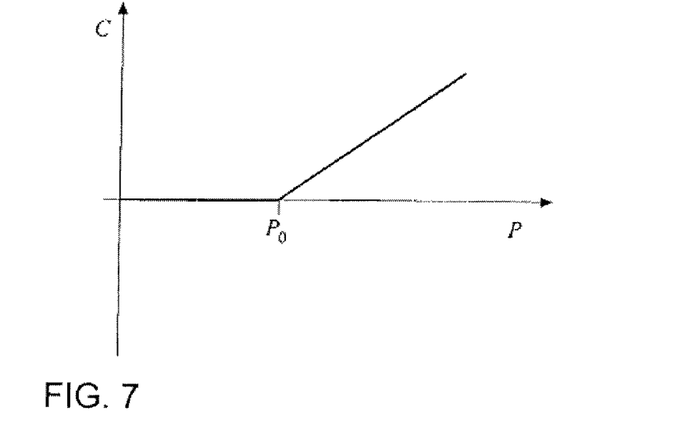
FIG. 7 shows a disclosed embodiment of a function implemented in a correction module.

The contrast correction module 60 also comprises correction modules 63 and 64 which are used to convert the elements of the matrix $$\begin{bmatrix} \sum_{j=1}^{n} I_{\wedge j1} & \cdots & \sum_{i=1}^{n} I_{jm} \end{bmatrix}$$

into elements of the matrix $$[C_{V1} \ldots C_{Vi} \ldots C_{Vm}]$$

and to convert the elements of the matrix $$\begin{bmatrix} \sum_{i=1}^{m} I_{1i} \\ \vdots \\ \sum_{i=1}^{m} I_{ni} \end{bmatrix}$$

into elements of the matrix $$\begin{bmatrix} C_{H1} \\ \vdots \\ C_{Hj} \\ \vdots \\ C_{Hn} \end{bmatrix}$$

in line with the function shown in FIG. 7. In this case, C denotes the elements of the matrix $$[C_{V1} \ldots C_{Vi} \ldots C_{Vm}]$$

and the matrix $$\begin{bmatrix} C_{H1} \\ \vdots \\ C_{Hj} \\ \vdots \\ C_{Hn} \end{bmatrix}$$

and P denotes the elements of the matrix $$\left[\sum_{j=1}^{n} I_{j1} \ldots \sum_{i=1}^{n} I_{jm}\right]$$

and the matrix $$\begin{bmatrix} \sum_{i=1}^{m} I_{1i} \\ \vdots \\ \sum_{i=1}^{m} I_{ni} \end{bmatrix}$$

In line with the function shown in FIG. 7, by way of example $C_{V1}$ is ascertained as follows:

$$C_{V1} = \begin{cases} m \cdot \left(\left(\sum_{j=1}^{n} I_{j1}\right) - P_0\right) & \text{for } \left(\sum_{j=1}^{n} I_{j1}\right) > P_0 \\ 0 & \text{for } \left(\sum_{j=1}^{n} I_{j1}\right) \le P_0 \end{cases}$$

where m is the gradient of a straight line and $P_0$ is an intervention offset.

The matrix $$[C_{V1} \ldots C_{Vi} \ldots C_{Vm}]$$

and the matrix $$\begin{bmatrix} C_{H1} \\ \vdots \\ C_{Hj} \\ \vdots \\ C_{Hn} \end{bmatrix}$$

are input variables into a limit value determination module 65 for determining an upper signal level limit value $I'_{max,ji}$, where $I'_{max,ji}$—under the secondary condition that it is greater than a lower signal level limit value $I_{min}$—is determined as follows:

$$I'_{max,ji} = I_{max} - C_{Vi} - C_{Hj} - a \cdot C_{Vi} \cdot C_{Hj}$$

where a is a constant and where $I_{max}$ is a constant, particularly in the magnitude of a standard contrast adjustment.

Figure 8:
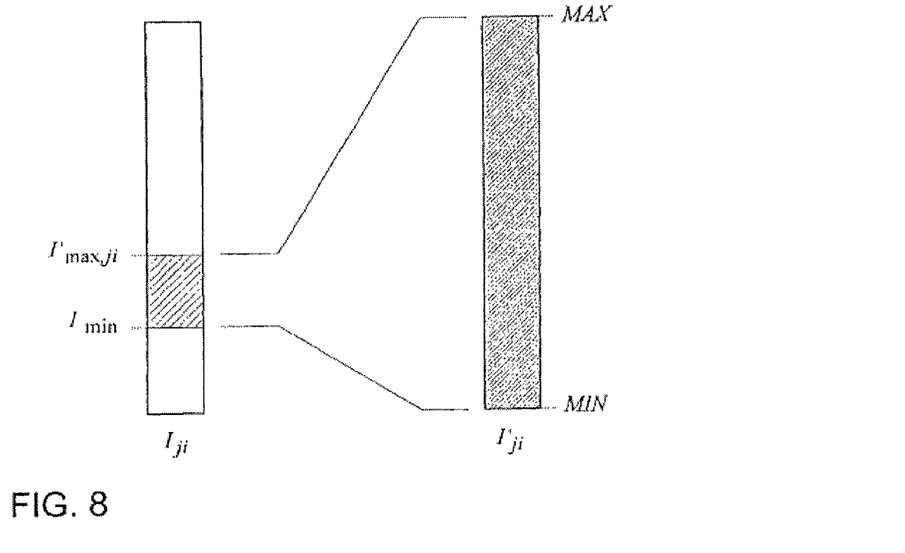
FIG. 8 shows an explanation of the functioning or operation of a contrast adjustment module.

$I'_{max,ji}$ is an input variable into a contrast adjustment module 66 which is used to convert the signal levels $$\begin{bmatrix} I_{11} & \cdots & I_{1m} \\ \vdots & \ddots & \vdots \\ I_{n1} & \cdots & I_{nm} \end{bmatrix}.$$

in line with the algorithm shown in FIG. 8 as follows into corrected signal levels $$\begin{bmatrix} I'_{11} & \cdots & I'_{1m} \\ \vdots & \ddots & \vdots \\ I'_{n1} & \cdots & I'_{nm} \end{bmatrix}.$$

signal levels $I_{ji}$ which are greater than the upper signal level limit value $I'_{max,ji}$ are set at a maximum possible signal level MAX. Signal levels which are less than a lower signal level limit value $I_{min}$ are set at a minimum value MIN, particularly zero. Signal levels $I_{ji}$ which are greater than the lower signal level limit value $I_{min}$ and are less than the upper signal level limit value $I'_{max,ji}$ are scaled in line with their level to a value between MAX and MIN, with the coarsely hatched region in FIG. 8 being mapped onto the finely hatched region.

Figure 9:
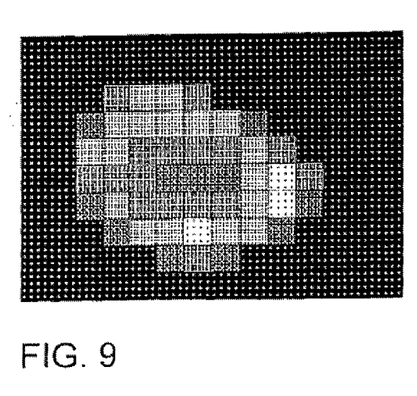
FIG. 9 shows a disclosed embodiment of the signal levels of a matrix touch screen when the ball of a thumb is placed onto the matrix touch screen.
Figure 10:
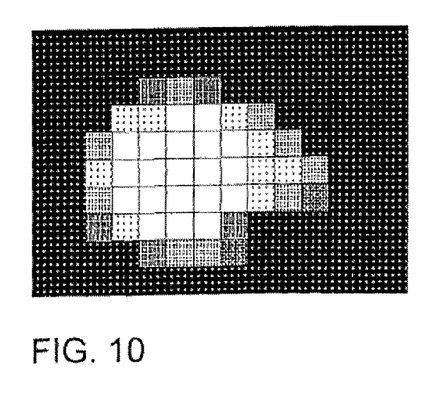
FIG. 10 shows a disclosed embodiment of the signal levels shown in FIG. 9 following contrast adjustment by means of a contrast adjustment module as shown in FIG. 8.

The functioning or action of the contrast correction module 60 is illustrated—in the form of a grayscale image—by FIG. 9 and FIG. 10 using the example of the ball of a thumb which is based onto the matrix touch screen 11. In this case, FIG. 9 shows $$\begin{bmatrix} I_{11} & \cdots & I_{1m} \\ \vdots & \ddots & \vdots \\ I_{n1} & \cdots & I_{nm} \end{bmatrix}$$

in the form of a grayscale image and FIG. 10 shows $$\begin{bmatrix} I'_{11} & \cdots & I'_{1m} \\ \vdots & \ddots & \vdots \\ I'_{n1} & \cdots & I'_{nm} \end{bmatrix}$$

in the form of a grayscale image. When the ball of a thumb is placed onto the surface of the matrix touch screen 11, although it can be detected as such, the individual matrix elements or pixels transmit very low signal levels. Furthermore, the center of the contact face indicates a signal dip which does not correspond to a relatively weak touch of the matrix touch screen 11. Following the contrast adjustment, the ball of the thumb can be detected distinctly better, as shown in FIG. 10.

Step 31 is followed by an optional interpolation step 32 in which interpolation is used, for example, to generate four pseudo matrix elements from a matrix element. The interpolation step 32 is optionally followed by a step 33 with a further contrast adjustment, which can be made in conventional fashion or line with the method described with reference to step 31.

Figure 11:
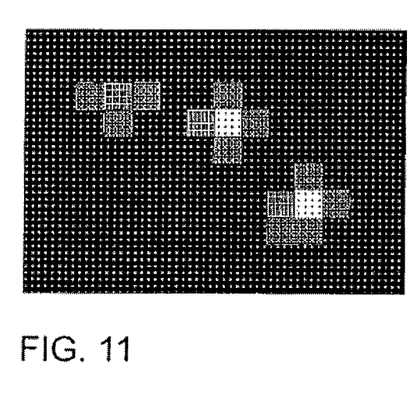
FIG. 11 shows a disclosed embodiment of the signal levels of a matrix touch screen when three fingertips are placed onto the matrix touch screen.
Figure 12:
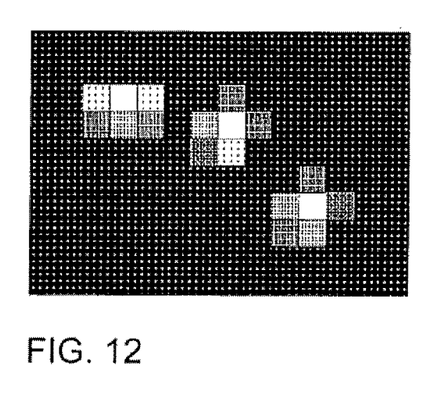
FIG. 12 shows a disclosed embodiment of the signal levels shown in FIG. 11 following contrast adjustment by means of a contrast adjustment module as shown in FIG. 8.
Figure 13:
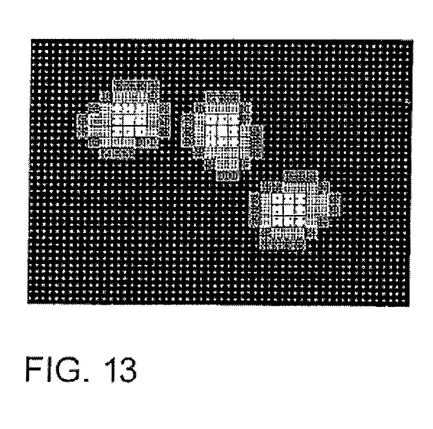
FIG. 13 shows a disclosed embodiment of the signal levels shown in FIG. 12 following quadrupling of the pixels by interpolation.
Figure 14:
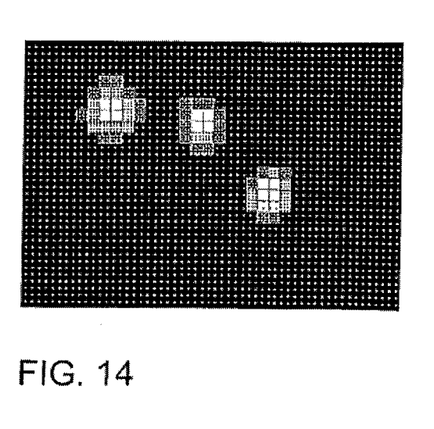
FIG. 14 shows a disclosed embodiment of the signal levels shown in FIG. 13 following fresh contrast adjustment.

FIG. 11, FIG. 12, FIG. 13 and FIG. 14 illustrate the mode of action of steps 31 to 33 with reference to a touch of the multitouch screen 11 by means of three fingertips, wherein FIG. 11 shows the input signal $$\begin{bmatrix} I_{11} & \cdots & I_{1m} \\ \vdots & \ddots & \vdots \\ I_{n1} & \cdots & I_{nm} \end{bmatrix}$$

in the form of a grayscale image. FIG. 12 shows—in the form of a grayscale image—the adjusted signal levels $$\begin{bmatrix} I'_{11} & \cdots & I'_{1m} \\ \vdots & \ddots & \vdots \\ I'_{n1} & \cdots & I'_{nm} \end{bmatrix}$$

following execution of step 31. FIG. 13 shows—in the form of a grayscale image—the signal levels following the interpolation step 32 and FIG. 14 shows—in the form of a grayscale image—the signal levels following fresh contrast adjustment as per step 33.

As can clearly be seen, steps 31, 32 and 33 allow contiguous areas, such as the touches which are respectively associated with a finger or a fingertip, to be detected. This detection of contiguous areas takes place in a step 34 by using the algorithm disclosed in the article "A Linear-Time Component-Labeling Algorithm Using Contour Tracing Technique", Fu Chang, Chun-Jen Chen and Chi-Jen Lu, Institute of Information Science, Academia Sinica, 128 Academia Road, Section 2, Nankang, Taipei 115 Taiwan, www.iis.sinica.edu.tw/~fchang/paper/component_labeling_cviu.pdf, with signal levels being assigned to a first variable beforehand when they are above a particular limit value and being assigned to a second variable when they are not above this limit value. The signal levels reduced to binary signals in this manner are then processed by means of the aforementioned algorithm, only a neighborhood of four being assumed, however.

Figure 15:
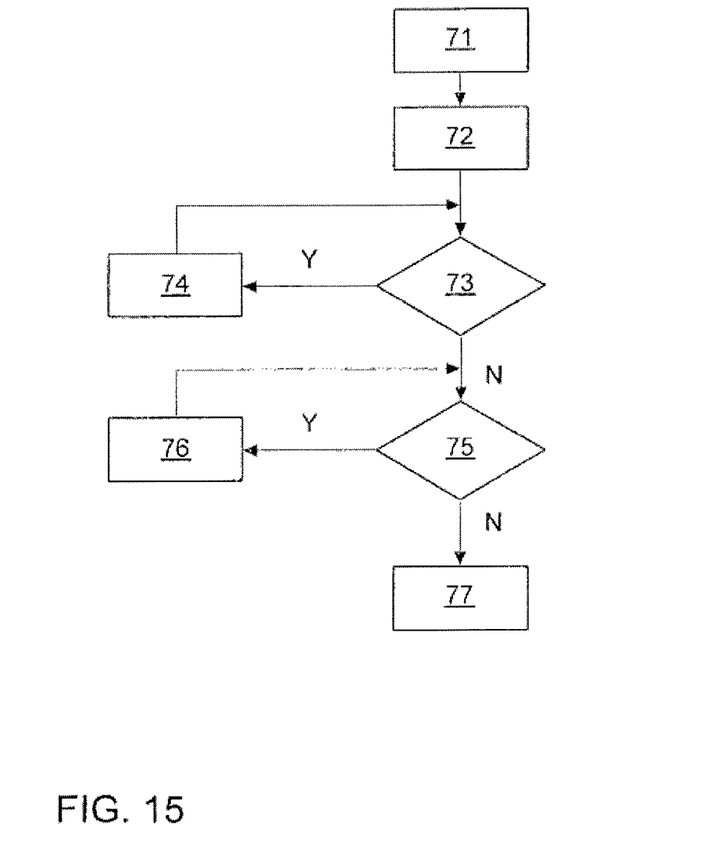
FIG. 15 shows a disclosed embodiment of a method for the operator control of a motor vehicle.
Figure 16:
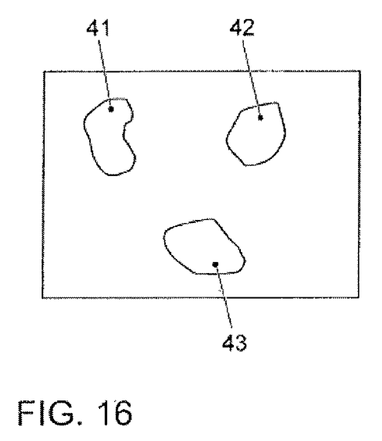
FIG. 16 shows a disclosed embodiment of detected touches of a multitouch screen at a sampling time i−1.
Figure 17:
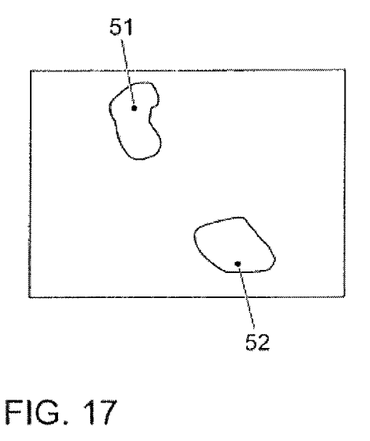
FIG. 17 shows a disclosed embodiment of detected touches of a multitouch screen at a sampling time I.

Step 34 is followed by what is known as a tracking step 35, which is used to detect contiguous movements from touches for different sampling steps. FIG. 15 shows a method for implementing this tracking step 35. FIG. 16 and FIG. 17 disclose embodiments of detected touches, with FIG. 16 showing the touches 41, 42, 43 of the matrix touch screen 11 at a sampling time i−1 and FIG. 17 showing the detected touches 51 and 52 of the matrix touch screen 11 at a sampling time i.

Figure 18:
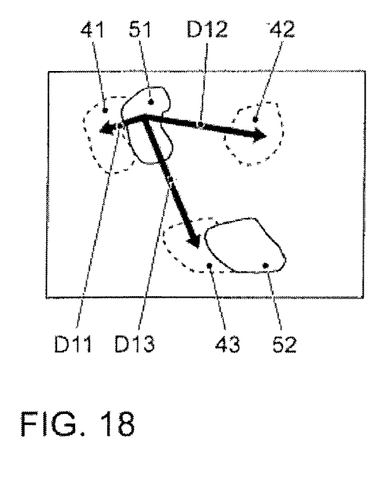
FIG. 18 shows a disclosed embodiment of detected touches of a multitouch screen at a sampling time i and at a sampling time i−1.
Figure 19:
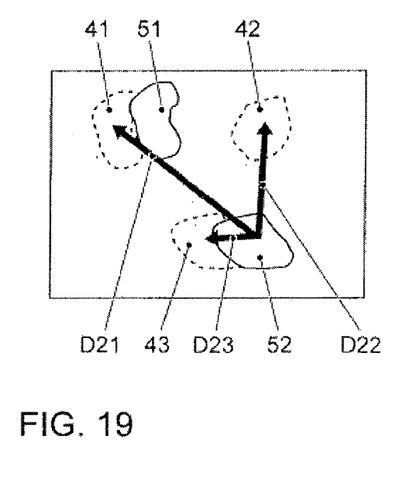
FIG. 19 shows a disclosed embodiment of detected touches of a multitouch screen at a sampling time i and at a sampling time i−1.

The method described with reference to FIG. 15 begins with a step 71, in which the distances of the touches 51 and 52 of the matrix touch screen 11 at the sampling time i from the touches 41, 42, 43 of the matrix touch screen 11 at the preceding sampling time i−1 are ascertained, as shown by way of example in FIG. 18 and FIG. 19. In this case, FIG. 18 and FIG. 19 show the touches 51 and 52 of the matrix touch screen 11 at the sampling time i. By contrast, the touches 41, 42, 43 of the matrix touch screen 11 at the sampling time i−1, which are no longer present, are merely shown in dashes. D11 denotes the distance between the touch 51 of the matrix touch screen 11 at the sampling time i and the touch 41 of the matrix touch screen 11 at the sampling time i−1, D12 denotes the distance between the touch 51 of the matrix touch screen 11 at the sampling time i and the touch 42 of the matrix touch screen 11 at the sampling time i−1, D13 denotes the distance between the touch 51 of the matrix touch screen 11 at the sampling time i and the touch 43 of the matrix touch screen 11 at the sampling time i−1, D21 denotes the distance between the touch 52 of the matrix touch screen 11 at the sampling time i and the touch 41 of the matrix touch screen 11 at the sampling time i−1, D22 denotes the distance between the touch 52 of the matrix touch screen 11 at the sampling time i and the touch 42 of the matrix touch screen 11 at the sampling time i−1, and D23 denotes the distance between the touch 52 of the matrix touch screen 11 at the sampling time i and the touch 43 of the matrix touch screen 11 at the sampling time i−1.

Figure 20:
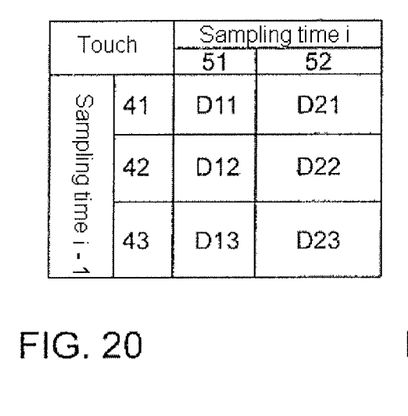
FIG. 20 shows a disclosed embodiment of a table containing designations of distances.
Figure 21:
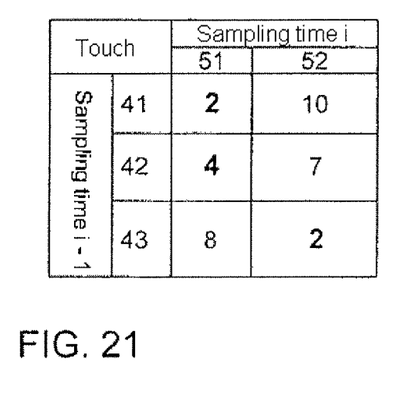
FIG. 21 shows a disclosed embodiment of associations between detected touches of a multitouch screen at a sampling time i and detected touches of a multitouch screen at a sampling time i−1.

FIG. 20 shows a table containing the relevant designations of the distances D11, D12, D21, D22 and D23. FIG. 21 shows this table with exemplary values. In this case, D11=2, D12=4, D13=8, D21=10, D22=7 and D23=2. To simplify matters, dimensionless variables have been chosen for the distances.

Step 71 is followed by a step 72, in which each touch 51, 52 of the matrix touch screen 11 at the sampling time i has that touch 41, 42, 43 of the matrix touch screen 11 at the preceding sampling time i−1, that is at the shortest distance D11, D12, D23 from the touch 51, 52 of the matrix touch screen 11 at the sampling time i associated with it. The associations are marked in FIG. 21 by the enlarged presentation and the bold text of the relevant numbers. The minimum distances which have been found are therefore the distances D11, D12 and D23.

Step 72 is followed by a test 73 to determine whether, as shown by way of example in FIG. 21, a touch 51 of the matrix touch screen 11 at the sampling time i has more than one associated touch 41, 42 of the matrix touch screen 11 at the preceding sampling time i−1. If a touch 51 of the matrix touch screen 11 at the sampling time i does have more than one associated touch 41, 42 of the matrix touch screen 11 at the preceding sampling time i−1, all associations between the touches 51, 41, 42 apart from the association at the shortest distance D11 are erased. In the example shown in FIG. 21, this means that the touch 51 of the matrix touch screen 11 at the sampling time i has both the associated touch 41 of the matrix touch screen 11 of the preceding sampling time i−1 and the associated touch 42 of the matrix touch screen 11 at the preceding sampling time i−1.

Figure 22:
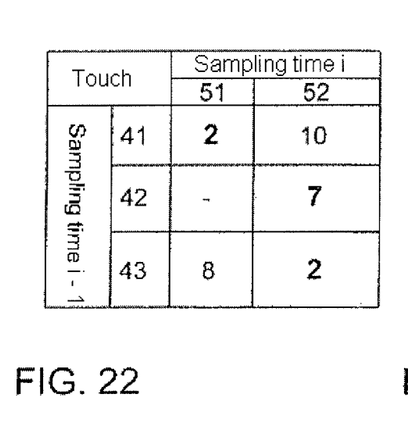
FIG. 22 shows another disclosed embodiment of associations between detected touches of a multitouch screen at a sampling time i and detected touches of a multitouch screen at a sampling time i−1.
Figure 23:
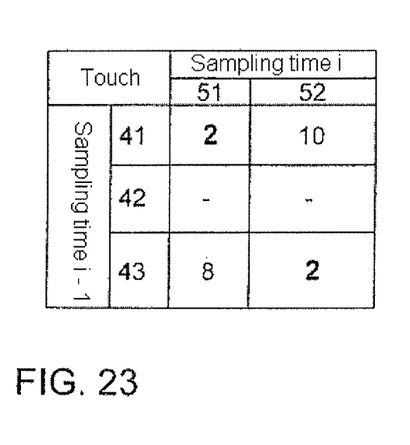
FIG. 23 shows a further disclosed embodiment of associations between detected touches of a multitouch screen and a sampling time i and detected touches of a multitouch screen at a sampling time i−1.

Since D12 having the value 4 is greater than the distance D11 having the value 2, the association between touch 51 of the matrix touch screen 11 at the sampling time i and the touch 42 of the matrix touch screen 11 at the sampling time i−1 is erased in a step 74. The result of this erasure is shown by way of example in FIG. 22, in which the value 4 has been removed from the table. As FIG. 22 shows, the erasure of the association between the touch 51 of the matrix touch screen 11 at the sampling time i and the touch 42 of the matrix touch screen 11 at the sampling time i−1 has resulted in an association between the touch 52 of the matrix touch screen 11 at the sampling time i and the touch 42 of the matrix touch screen 11 at the sampling time i−1, however. Therefore, in at least one disclosed embodiment, the loop comprising test 73 and step 74 is executed again, with the value 7, that is to say the association between the touch 52 of the matrix touch screen 11 at the sampling time i and the touch 42 of the matrix touch screen 11 at the sampling time i−1, being erased, since the distance D22 having the value 7 is greater than the distance D23 having the value 2.

If a touch of the matrix touch screen 11 at the sampling time i no longer has an associated touch of the matrix touch screen 11 at the preceding sampling time i−1, the test 73 is followed by a test 75 to determine whether a distance D11, D12, D13, D21, D22, D23 is greater than a limit value $D_{max}$ with $$D_{max} = i \cdot k \cdot \Delta t \cdot v_{max},$$

where $D_{max}$ is the limit value, i is an interpolation factor, k is the distance between two parallel sensor lines of the matrix touch screen 11 or the real resolution of the matrix touch screen 11, $\Delta t$ is the sampling interval and $v_{max}$ is a speed limit value. The speed limit value is not greater than 0.25 m/s when the function is the displacement of a graphical element on a display, not greater than 0.5 m/s when the function is handwriting input and not greater than 1 m/s when the function is the scrolling of list entries displayed on a display.

If there is a distance between two touches which is greater than the limit value $D_{max}$, the association that corresponds to this distance is erased in a step 76. In the present example, the limit value $D_{max}$ is 9, for example. Therefore, as indicated by way of example in FIG. 24, a possible association between the touch 52 and the touch 41 would be erased.

Figure 24:
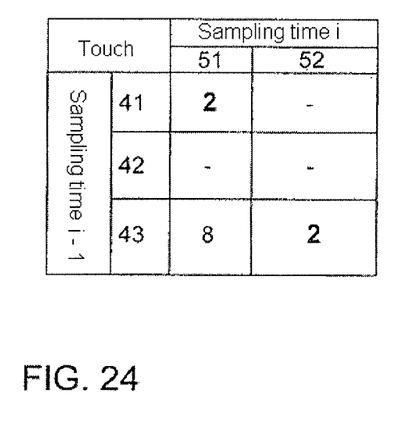
FIG. 24 shows yet another disclosed embodiment of associations between identified touches of a multitouch screen and a sampling time i and a detected touches of a multitouch screen at a sampling time i−1.

If there is no association which involves a distance which is greater than the limit value $D_{max}$, the test 75 is followed by a step 77 in which the touches associated with one another are associated with one and the same touching movement over the matrix touch screen 11, that is to say a trajectory. In the examples shown in FIG. 21, FIG. 22, FIG. 23 and FIG. 24, these are—as FIG. 24 shows—the associations between the touches 51 and 41 and the associations between the touches 52 and 43. That is to say that the touch 51 and the touch 41 are associated with one and the same touching movement over the matrix touch screen 11. Similarly, the touches 52 and 43 are associated with one and the same touching movement over the matrix touch screen 11. The system therefore detects two touching movements over the matrix touch screen 11.

Figure 25:
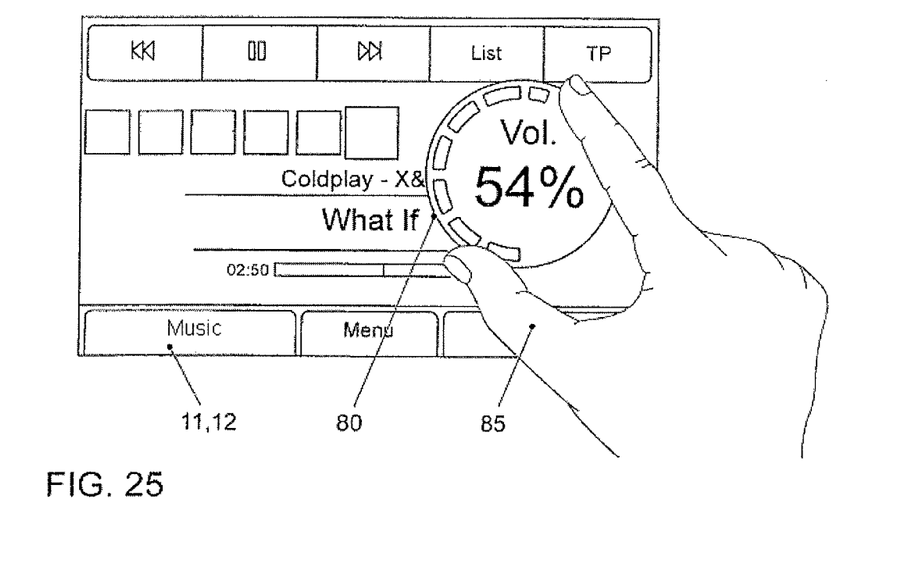
FIG. 25 shows a disclosed embodiment of a virtual rotary control.

Either step 34 or step 35 is followed by a step 36 in which the detected two-dimensional touch or the moving touch is classified. This allows particularly suitable detection of, in particular, touches by fingertips from the ball of a thumb and operator control of a virtual rotary control. FIG. 25 discloses an embodiment of such a virtual rotary control 80 which can be presented by means of the display 12 and controlled by means of the multitouch screen 11. In this case, reference symbol 85 denotes the hand of a user who is using two fingers to perform a rotary movement over the multitouch screen 11 which, using the method described, can be interpreted as operator control of the rotary control 80 and, in the embodiment described, results in appropriate adjustment of the volume of an audio signal.

The display controller 10 may have a plurality of processors implemented in it which each execute the method described in FIG. 4 in parallel for a particular number of matrix elements in each case.

The invention claimed is:

1. A method for operating a capacitive, matrix touch screen, for use in a motor vehicle, wherein touching the matrix touch screen in the region of a matrix element prompts a signal level associated with the matrix element to be produced, the method comprising:

modifying the signal level associated with the matrix element which is produced when the matrix touch screen is touched in the region of the matrix element such that the signal level is increased when this signal level exceeds an upper signal level limit value;

is decreased when this signal level is below a lower signal level limit value;

is scaled when this signal level is below the upper signal level limit but exceeds the lower signal level limit value, wherein the modified signal levels of two adjacent matrix elements are taken as a basis for determining whether the two matrix elements have been touched as part of a joint two-dimensional touch of the matrix touch screen.

2. The method of claim 1, wherein the modified signal levels of a matrix element and of four matrix elements adjacent to this matrix element are taken as a basis for determining whether the matrix element and the adjacent matrix elements are being touched as part of a joint two-dimensional touch of the matrix touch screen.

3. The method of claim 1, wherein the upper signal level limit value for a matrix element is determined on the basis of the sum of the signal levels of a plurality of matrix elements in the row of the matrix element or the sum of the signal levels of all essential matrix elements in the row of the matrix element.

4. The method of claim 1, wherein the upper signal level limit value for a matrix element is determined on the basis of the sum of the signal levels of a plurality of matrix elements in the column of the matrix element or the sum of the signal levels of all essential matrix elements in the column of the matrix element.

5. The method of claim 1, wherein the distance of a detected two-dimensional touch of the matrix touch screen at a sampling time from a detected two-dimensional touch of the matrix touch screen at a preceding sampling time is ascertained.

6. The method of claim 5, wherein the ascertained distance is taken as a basis for determining whether the detected two-dimensional touches are part of the same touching movement over the matrix touch screen.

7. The method of claim 1, wherein the distances of the detected two-dimensional touches of the matrix touch screen at a sampling time from the detected two-dimensional touches of the matrix touch screen at a preceding sampling time are ascertained.

8. The method of claim 7, wherein the ascertained distances are taken as a basis for determining whether the detected two-dimensional touches are part of the same touching movement over the matrix touch screen.

* * * * *